United States Patent [19]

Ohishi et al.

[11] 4,096,135

[45] Jun. 20, 1978

[54] VULCANIZED PRODUCT OF TERPOLYMER AND PROCESS FOR PREPARATION THEREOF

[75] Inventors: Tetsu Ohishi, Tokyo; Hiroshi Fukushima, Zushi, both of Japan

[73] Assignee: Nippon Zeon Co. Ltd., Tokyo, Japan

[21] Appl. No.: 542,794

[22] Filed: Jan. 21, 1975

[30] Foreign Application Priority Data

Jan. 24, 1974 Japan .................................. 49-10387

[51] Int. Cl.$^2$ ............................................ C08F 28/00
[52] U.S. Cl. .................................. 260/79.5 B; 526/20; 526/337; 526/342
[58] Field of Search .......................... 260/79.5 B, 80.7; 526/20, 337, 342

[56] References Cited

U.S. PATENT DOCUMENTS

| | | | |
|---|---|---|---|
| 2,384,546 | 9/1945 | Fryling | 260/80.7 |
| 2,657,190 | 10/1953 | Banes | 260/79.5 B |

*Primary Examiner*—Lewis T. Jacobs
*Attorney, Agent, or Firm*—Sherman & Shalloway

[57] ABSTRACT

A novel vulcanized product of a terpolymer is prepared by heating acrylonitrile/butadiene-1,3/2-methyl butadiene-1,3 comprising 15 to 45% by weight of combined acrylonitrile and 85 to 55% by weight of combined diene, said combined diene consisting of 65 to 95% by weight of combined butadiene-1,3 and 35 to 5% by weight of combined 2-methylbutadiene-1,3, in the presence of a vulcanizing agent at a temperature of 100° to 220° C. for about 1 minute to 2 hours.

4 Claims, No Drawings

VULCANIZED PRODUCT OF TERPOLYMER AND PROCESS FOR PREPARATION THEREOF

This invention relates to a vulcanized product of an acrylonitrile/butadiene-1,3/2-methyl butadiene-1,3-terpolymer, and a process for its preparation.

Copolymer rubbers derived from acrylonitrile and butadiene-1,3 (to be referred to as NBR) are well known. Since NBR has superior oil resistance, its vulcanized product has been widely used for various sealing materials, O-rings, diaphragms, hoses and gaskets. The properties of the NBR vulcanized product are generally dependent upon the amount of acrylonitrile combined. Generally, as the amount of the combined acrylonitrile increases, the oil resistance, solvent resistance, chemical resistance, wear resistance, resistance to gas-permeability, hardness, tensile stress and tensile strength (after aging) of the NBR vulcanized product are improved, but on the other hand, its cold resistance and rebound tend to be reduced. Accordingly, a great many formulations of NBR with varying amounts of combined acrylonitrile have been produced, according to the desired end uses.

Copolymer rubbers derived from acrylonitrile and 2-methyl butadiene-1,3 (isoprene) (to be referred to as NIR) are also well known. Structurally, NIR results from the replacement of the butadiene-1,3 portion of NBR by 2-methyl butadiene-1,3. A vulcanized product of NIR is characterized by having a higher tensile strength than the NBR vulcanized product in the absence of a filler or a reinforcing agent such as carbon black or finely divided silicic acid. However, the NIR vulcanized product has very poor cold resistance as compared with the NBR vulcanized product when the amount of the combined acrylonitrile is the same for both. Thus, in spite of its superior strength characteristics, NIR has found only limited use as an oil-resistant rubber, and has been used only partially as a substitute in the field where NBR is used.

Accordingly, it is as object of this invention to provide a vulcanized product having the merits of both the NBR vulcanized product and the NIR vulcanized product and being free from the defects of the NIR vulcanized product, that is to say, a vulcanized product having high tensile strength both in the normal state and after aging, superior cold resistance, reduced permanent compression set, and high rebound.

We have found that a vulcanized product of acrylonitrile/butadiene-1,3/2-methyl butadiene-1,3 comprising 15 to 45% by weight of combined acrylonitrile and 85 to 55% by weight of combined diene, said combined diene consisting of 65 to 95% by weight of combined butadiene-1,3 and 35 to 5% by weight of combined 2-methyl butadiene-1,3 meets the above object of this invention.

It is essential that the terpolymer before vulcanization should have the composition specified above. If a terpolymer having compositions other than that specified above is vulcanized, a vulcanized product meeting the object of this invention cannot be obtained. Furthermore, if a mixture of NBR and NIR which is prepared so as to have the above composition is vulcanized, the resulting vulcanized product does not exhibit such a high tensile strength, especially after aging, as is possessed by the vulcanized product of this invention. A vulcanized product of a terpolymer consisting of styrene/butadiene-1,3/2-methyl butadiene-1,3, which results from the replacement of the acrylonitrile of the terpolymer of the invention by styrene, does not bring about the advantages as in the case of the vulcanized product of this invention.

The terpolymer used in this invention can be obtained by polymerizing a monomeric mixture consisting of 10 to 50% by weight of acrylonitrile and 90 to 50% by weight of butadiene-1,3 and 2-methyl butadiene-1,3, the weight ratio of the butadiene-1,3 to the 2-methyl butadiene-1,3 being 98:2 to 65:35, in accordance with an ordinary emulsion polymerization recipe, until the conversion reaches 50% to 95%.

It is widely known that the relationship between the feed composition of comonomers and the composition of the resulting copolymer in copolymerizations is determined by the reactive ratio between the two comonomers. In terpolymerizations, too, the feed composition of monomers required to obtain a terpolymer of the desired composition can be calculated if the three reactive ratios of each set of two monomers selected from the three monomers are measured (see T. Alfrey, HIGH POLYMERS, Vol. 8, "COPOLYMERIZATION", p. 124, 1952, Interscience Co.). The weight ratios of monomers fed, as shown in the Examples below, were calculated by an electronic digital computer using the reactive ratio between acrylonitrile and butadiene-1,3 measured by an experiment in accordance with the Mayo-Lewis' intersection method, the reactive ratio between acrylonitrile and 2-methyl butadiene-1,3 measured by a similar experiment to the above, and the reactive ratio between butadiene-1,3 and 2-methyl butadiene-1,3 as described in L. J. Young, Journal of Polymer Science, Vol. 54, p. 411, 1961.

So long as the advantages intended by this invention are not impaired, up to 10% by weight of the above feed monomeric mixture can be replaced by another monomer copolymerizable therewith, such as an ethylenically unsaturated carboxylic acid or its ester, or a vinyl pyridine, in the preparation of the terpolymer of this invention.

A conventional free radical catalyst such as a peroxide, a Redox-system, a persulfate or an azo compound can be used as a polymerization initiator. The emulsifier to be used is an anionic, cationic, nonionic or amphoteric surface active agent. Furthermore, a dispersing agent such as the sodium salt of polymerized naphthalene sulfonic acid or a builder such as an inorganic salt (e.g., sodium pyrophosphate or potassium chloride) can also be used conjointly as required. Typical examples of a molecular-weight regulating agents used in this invention are mercaptans such as tertiary dodecyl mercaptan or normal dodecyl mercaptan.

The polymerization is performed at 0° to 80° C. in a reactor free from oxygen. The monomers, emulsifier, initiator and other chemicals may be added all at one time beffore the initiation of the reaction, or may be added portionwise after the initiation of the reaction. Operating conditions such as the reaction temperature or stirring can be changed optionally during the reaction. The polymerization may be carried out continuously, batchwise, or half batchwise.

The form of the terpolymer is not particularly restricted, and may be a solid, liquid or latex according to the end use. The molecular weight of the terpolymer is also not critical, but when the terpolymer is used in a solid form, it preferably has a Mooney viscosity ($ML_{1+4}$, 100° C.) of 20 to 150.

The vulcanized product of this invention is obtained by heating the resulting terpolymer in the presence of a vulcanizing agent. Any conventional vulcanizing agents can be used in this invention, examples of which are sulfur; compounds capable of generating sulfur under the vulcanization conditions, such as thiurams and morpholines; and organic peroxides such as dicumyl peroxide or 2,5-dimethyl-2,5-di(tertiary butyl peroxy)hexane. The amount of the vulcanizing agent is 0.1 to 10 parts by weight per 100 parts by weight of the terpolymer.

If desired, a conventional vulcanization promotor, such as dithiocarbamates, guanidines, thiazoles, imidazoles, thiurams, aldehyde-amine condensates, or aldehyde-ammonia condensates, can be used together with the vulcanizing agent. The amount of the promoter is 0.1 to 5 parts by weight per 100 parts by weight of the terpolymer.

Furthermore, conventional additives used for rubber vulcanization, for example, reinforcing agents, fillers, plasticizers, softening agents, antioxidants, stabilizers, foaming agents or processing assistants, can also be used in suitable amounts as desired.

If required, NBR, NIR, natural rubber, polybutadiene rubber, polyisoprene rubber, styrene-butadiene rubber, acrylic rubber, ethylene-propylene rubber, ethylene-propylenediene rubber, ethylene-vinyl acetate rubber, and epichlorohydrin rubber, etc. can be mixed with the terpolymer of this invention, in such an amount that does not impair the advantages intended by the present invention.

Compounding of the terpolymer with the various additives on rubbers described above is performed by using known means such as a roll or Bambury mixer. The compounded composition is vulcanized at 100° to 220° C., preferably at 140° to 180° C., for about 1 minute to 2 hours using ordinary molding machines such as a press, injection molder, or transfer molder.

The vulcanized product of this invention has high tensile strength, rebound and tensile strength after aging, superior cold resistance and low permanent compression set. These advantages render it preferably useful for various sealing materials, O-rings, diaphragms, hoses, gaskets, thread rubbers, oil tanks, oil transport pipes, sponges, binders for non-woven fabrics or paper, and latex products (for example, gloves) produced by immersion methods.

The following non-limitative Examples specifically illustrate the present invention. In the Examples, all parts are by weight.

EXAMPLE 1 (Production of Polymer)

The following monomers were polymerized at 5° C. in an autoclave having an inner capacity of about 13 liters in accordance with the following recipe.

| | |
|---|---|
| Acrylonitrile | ⎫ 100 parts in total |
| Butadiene-1,3 | ⎬ (for the breakdown, |
| 2-Methyl butadiene-1,3 | ⎭ see Table 1 below) |
| Water | 230 parts |
| Sodium dodecylbenzenesulfonate | 2.0 parts |
| Sodium dibutylnaphthalene sulfonate | 1.5 parts |
| Trisodium phosphate | 0.2 parts |
| Tertiary dodecyl mercaptan | variable (see Table 1) |
| $FeSO_4 \cdot 7H_2O$ | 0.006 part |
| Trisodium ethylenediamine tetracetate | 0.020 part |
| Sodium formaldehyde sulfoxylate | 0.08 part |
| p-Menthane hydroperoxide | 0.06 part |

When the conversion reached the value shown in Table 1, 0.2 part of hydroxylamine sulfate (a polymerization stopper whose pH had been adjusted to about 10 with sodium hydroxide) was added per 100 parts of the monomers to stop the polymerization. The resulting mixture was heated, and the residual monomers were removed at reduced pressure. Then, 2.5 parts of an alkylated aryl phosphite as an anti-oxidant was added per 100 parts of the rubber solids content, and the latex was coagulated with an aqueous solution of calcium chloride. The resulting crumb was washed with water, and dried at reduced pressure at a temperature of 50° C. In this manner, polymer samples 1 to 20 prepared.

Polymer samples 21, 22, 23, 24 and 25 were prepared in accordance with the procedures for preparing the polymer samples 11, 12, 4, 17 and 18 respectively except that 2,3-dimethylbutadiene-1,3 was used instead of the 2-methyl butadiene-1,3.

The Mooney viscosities and compositions of the resulting polymer samples are shown in Table 1.

As is shown in Table 1, the polymer samples 1 to 8 all have a combined acrylonitrile content of about 34% (the amount of the combined diene is about 66%), but the ratio of the combined butadiene-1,3 to the combined 2-methyl butadiene-1,3 is varied; the polymer samples 9 to 14 have a combined acrylonitrile content of about 16% (the amount of the combined diene is about 84%), but the ratio of the combined butadiene-1,3 to the combined 2-methyl butadiene-1,3 is varied; and the polymer samples 15 to 20 have a combined acrylonitrile content of about 40% (the amount of the combined diene is about 60%), but the ratio of the combined butadiene-1,3 to the combined 2-methyl butadiene-1,3 is varied.

Table 1

| | | Polymerization | | | | | Polymer | | | |
|---|---|---|---|---|---|---|---|---|---|---|
| | | Monomer fed (parts) | | | Tertiary | Con- | Mooney | Combined | Combined | Weight ratio of combined |
| Polymer samples No. | Type | Acrylonitrile | Butadiene-1,3 | 2-Methyl butadiene-1,3 | dodecyl mercaptan fed (parts) | version (%) | Viscosity ($ML_{1+4}$, 100° C) | Acrylonitrile content (wt. %) | diene content (wt. %) | butadiene-1,3 to combined 2-methyl bbutadiene-1,3 (theoretical value) |
| 1 | Control | 33.5 | 66.5 | — | 0.35 | 87.5 | 77.5 | 34.1 | 65.9 | 100/0 |
| 2 | Invention | 33.5 | 60.8 | 5.7 | 0.34 | 88.3 | 74.5 | 33.9 | 66.1 | 90/10 |
| 3 | " | 33.5 | 50.5 | 16.0 | 0.33 | 89.8 | 69.0 | 34.2 | 65.8 | 75/25 |
| 4 | " | 33.5 | 45.5 | 21.0 | 0.32 | 86.7 | 75.0 | 33.7 | 66.3 | 65/35 |
| 5 | Control | 34.0 | 35.5 | 31.0 | 0.32 | 89.3 | 80.5 | 34.1 | 65.9 | 50/50 |
| 6 | " | 34.0 | 26.0 | 40.0 | 0.31 | 89.1 | 78.5 | 33.7 | 66.3 | 35/65 |
| 7 | " | 34.0 | 19.0 | 47.0 | 0.31 | 87.7 | 86.0 | 34.3 | 65.7 | 25/75 |
| 8 | " | 34.0 | — | 56.0 | 0.30 | 88.4 | 79.0 | 34.2 | 65.8 | 0/100 |
| 9 | " | 15.0 | 85.0 | — | 0.30 | 60.7 | 79.5 | 18.0 | 82.0 | 100/0 |
| 10 | Invention | 15.5 | 76.5 | 8.0 | 0.27 | 62.5 | 72.5 | 18.3 | 81.7 | 90/10 |
| 11 | " | 16.0 | 64.0 | 20.0 | 0.25 | 61.7 | 69.0 | 18.9 | 81.1 | 75/25 |
| 12 | " | 16.0 | 57.0 | 27.0 | 0.23 | 61.8 | 83.0 | 19.1 | 80.9 | 65/35 |
| 13 | Control | 16.0 | 23.0 | 61.0 | 0.21 | 63.2 | 78.5 | 18.7 | 81.3 | 25/75 |
| 14 | " | 16.5 | — | 83.5 | 0.18 | 62.1 | 80.0 | 19.2 | 80.8 | 0/100 |
| 15 | " | 40.0 | 60.0 | — | 0.43 | 87.2 | 81.5 | 39.7 | 60.3 | 100/0 |
| 16 | Invention | 39.5 | 55.0 | 5.5 | 0.37 | 88.2 | 78.5 | 39.5 | 60.5 | 90/10 |

Table 1-continued

| Polymer samples No. | Type | Polymerization Monomer fed (parts) Acrylonitrile | Butadiene-1,3 | 2-Methyl butadiene-1,3 | Tertiary dodecyl mercaptan fed (parts) | Conversion (%) | Polymer Mooney Viscosity (ML$_{1+4}$, 100° C) | Combined Acrylonitrile content (wt. %) | Combined diene content (wt. %) | Weight ratio of combined butadiene-1,3 to combined 2-methyl butadiene-1,3 (theoretical value) |
|---|---|---|---|---|---|---|---|---|---|---|
| 17 | " | 40.0 | 46.5 | 133.5 | 0.36 | 89.7 | 80.0 | 40.4 | 59.6 | 75/25 |
| 18 | " | 41.0 | 40.0 | 19.0 | 0.35 | 88.3 | 76.0 | 40.2 | 59.8 | 65/35 |
| 19 | Control | 42.0 | 16.0 | 42.0 | 0.35 | 89.5 | 71.5 | 39.8 | 60.2 | 25/75 |
| 20 | " | 43.0 | — | 57.0 | 0.32 | 88.1 | 83.0 | 40.4 | 59.6 | 0/100 |
| 21 | " | 16.0 | 64.0 | 20.0* | 0.25 | 62.0 | 65.3 | 19.3 | 80.7 | 75/25 |
| 22 | " | 16.0 | 57.0 | 27.0* | 0.23 | 61.5 | 78.5 | 19.8 | 80.2 | 65/35* |
| 23 | " | 33.5 | 45.5 | 21.0* | 0.32 | 87.8 | 80.5 | 34.2 | 65.8 | 65/35* |
| 24 | " | 40.0 | 46.5 | 13.5* | 0.36 | 88.1 | 83.0 | 39.5 | 60.5 | 75/25* |
| 25 | " | 41.0 | 40.0 | 19.0* | 0.35 | 89.3 | 70.5 | 39.8 | 60.2 | 65/35* |

*2,3-dimethylbutadiene-1,3 was used instead of the 2-methyl butadiene-1,3.

EXAMPLE 2 (Test 1 for the characteristics of the vulcanizate)

Compositions were prepared from each of the polymer samples 1 to 20 in accordance with the following compounding recipe, and vulcanized at 150° C. for 45 minutes. The characteristics of the resulting vulcanizates were evaluated in accordance with JIS K-6301. The results are shown in Tables 2, 3 and 4.

| Compounding recipe | |
|---|---|
| Copolymer | 100 parts |
| Zinc oxide (No. 1) | 3 parts |
| Sulfur | 1.5 parts |
| Stearic acid | 0.5 part |
| HAF black | 40 parts |
| Dibenzothiazyl disulfide | 1.0 part |

Table 2

| Polymer samples No. | 1 | 2 | 3 | 4 | 5 | 6 | 7 | 8 |
|---|---|---|---|---|---|---|---|---|
| Type | Control Sample | Samples of the invention | | | | Control samples | | |
| Weight ratio of combined butadiene-1,3/combined 2-methyl butadiene-1,3 | 100/0 | 90/10 | 75/25 | 65/35 | 50/50 | 35/65 | 25/70 | 0/100 |
| Properties of vulcanizates | | | | | | | | |
| Tensile strength (Kg/cm²) | 237 | 269 | 276 | 312 | 323 | 315 | 286 | 272 |
| Elongation (%) | 670 | 580 | 510 | 540 | 600 | 620 | 650 | 720 |
| 300% Modulus (Kg/cm²) | 104 | 121 | 138 | 139 | 122 | 110 | 106 | 94 |
| Hardness(JIS) | 64 | 65 | 65 | 65 | 64 | 65 | 65 | 66 |
| Rebound (%) | 41.0 | 39.0 | 38.0 | 36.0 | 30.0 | 21.0 | 16.0 | 10.0 |
| Permanent compression set (%) (100° C. × 70 hrs.) | 80.5 | 65.5 | 64.8 | 66.5 | 71.0 | 76.5 | 80.5 | 93.6 |
| Gehman Test (° C) | | | | | | | | |
| T2 | −10 | −10 | −8 | −7 | −5 | −2 | +1 | +7 |
| T100 | −26 | −25 | −24 | −22 | −17 | −14 | −12 | −5 |
| Tensile strength (Kg/cm²) after aging in air | | | | | | | | |
| After 100° C. × 70 hrs. | 201 | 265 | 246 | 298 | 267 | 243 | 195 | 185 |
| After 100° C. × 168 hrs. | 174 | 243 | 226 | 271 | 240 | 201 | 174 | 165 |

Table 3

| samples No. | 9 | 10 | 11 | 12 | 13 | 14 |
|---|---|---|---|---|---|---|
| Type | Control sample | Samples of the invention | | | Control samples | |
| Weight ratio of combined butadiene-1,3/combined 2-methyl butadiene-1,3 | 100/0 | 90/10 | 75/25 | 65/35 | 25/75 | 0/100 |
| Properties of vulcanizates | | | | | | |
| Tensile strength (Kg/cm²) | 137 | 200 | 232 | 247 | 223 | 220 |
| Elongation (%) | 400 | 560 | 700 | 670 | 800 | 900 |
| 300% modulus (Kg/cm²) | 94 | 78 | 71 | 80 | 62 | 56 |
| Hardness (JIS) | 60 | 60 | 60 | 61 | 60 | 60 |
| Rebound (%) | 54.0 | 51.5 | 45.5 | 44.0 | 28.0 | 21.5 |
| Permanent compression set (%) (100° C. × 70 hrs.) | 79.1 | 71.0 | 71.6 | 69.0 | 77.0 | 84.7 |
| Gehman Test (° C) | | | | | | |
| T$_2$ | −16 | −16 | −15 | −14 | −7 | −3 |
| T$_{100}$ | −42 | −40 | −34 | −32 | −23 | −18 |
| Tensile strength (Kg/cm²) after aging in air | | | | | | |
| After 100° C. × 70 hrs. | 173 | 221 | 254 | 255 | 180 | 163 |
| After 100° C. 168 hrs. | 155 | 215 | 234 | 243 | 160 | 136 |

Table 4

| Polymer samples | No. | 15 | 16 | 17 | 18 | 19 | 20 |
|---|---|---|---|---|---|---|---|
| | Type | Control sample | Samples of the invention | | | Control samples | |
| Weight ratio of combined butadiene-1,3/combined 2-methyl butadiene-1,3 | | 100/0 | 90/10 | 75/25 | 65/35 | 25/75 | 0/100 |
| Properties of vulcanizates | | | | | | | |
| Tensile strength (Kg/cm²) | | 316 | 342 | 366 | 350 | 290 | 270 |
| Elongation (%) | | 600 | 620 | 630 | 660 | 620 | 620 |
| 300% modulus (Kg/cm²) | | 131 | 135 | 139 | 140 | 127 | 122 |
| Hardness (JIS) | | 69 | 68 | 68 | 68 | 70 | 72 |
| Rebound (%) | | 21.5 | 22.0 | 22.0 | 18.5 | 7.0 | 4.0 |
| Permanent compression set (%) (100° C. × 70 hrs.) | | 77.0 | 72.0 | 71.5 | 72.5 | 92.5 | 94.6 |
| Gehman Test (° C) | | | | | | | |
| $T_2$ | | ±0 | ±0 | ±0 | 1 | +7 | +10 |
| $T_{100}$ | | −17 | −17 | −15 | −13 | −8 | −1 |
| Tensile strength (Kg/cm²) after aging in air | | | | | | | |
| After 100° C. × 70 hrs. | | 281 | 305 | 312 | 301 | 256 | 247 |
| After 100° C. × 168 hrs. | | 274 | 298 | 304 | 297 | 219 | 217 |

As is seen from Table 2, the samples in accordance with this invention have high tensile strength both in the normal state and after aging, and low permanent compression set that cannot be expected from the control samples, and also exhibit superior low temperature characteristics to those of the control samples 1 and 5 taken as an arithmetic mean. The same can be said with respect to Tables 3 and 4.

EXAMPLE 3 (Test 2 for the characteristics of the vulcanizates)

The same test as in Example 2 was performed except that control samples 21 to 25 were used. The results are shown in Table 5.

Table 5

| Polymer samples | No. | 21 | 22 | 23 | 24 | 25 |
|---|---|---|---|---|---|---|
| | Type | Control samples | | | | |
| Weight ratio of combined butadiene-1,3/combined 2,3-dimethyl butadiene-1,3 | | 75/25 | 65/35 | 65/35 | 75/25 | 65/35 |
| Properties of vulcanizates | | | | | | |
| Tensile strength (Kg/cm²) | | 179 | 173 | 188 | 192 | 186 |
| Elongation (%) | | 450 | 440 | 460 | 470 | 460 |
| 300% modulus (Kg/cm²) | | 112 | 109 | 138 | 132 | 140 |
| Hardness (JIS) | | 66 | 66 | 69 | 70 | 70 |
| Rebound (%) | | 31.5 | 27.5 | 18.5 | 9.5 | 7.5 |
| Permanent compression set (%) (100° C. × 70 hrs.) | | 92.5 | 92.0 | 92.9 | 95.0 | 96.7 |
| Gehman Test (° C.) | | | | | | |
| $T_2$ | | −5 | −3 | +4 | +7 | +13 |
| $T_{100}$ | | −17 | −14 | −7 | −3 | +2 |
| Tensile strength (Kg/cm²) after aging in air | | | | | | |
| After 100° C. × 70 hrs. | | 181 | 170 | 178 | 180 | 172 |
| After 100° C. × 168 hrs. | | 160 | 146 | 145 | 161 | 160 |

As is clear from Table 5, the terpolymer of acrylonitrile/butadiene-1,3/2,3-dimethylbutadiene-1,3 in which 2,3-dimethyl butadiene-1,3 was used instead of the 2-methyl butadiene-1,3 did not exhibit such superior characteristics of the terpolymer used in this invention.

EXAMPLE 4 (Test 3 for the characteristics of the vulcanizates)

The same test as in Example 2 was performed except that two polymer samples 26 and 27 obtained by mixing the polymer sample 1 (NBR) and the polymer sample 8 (NIR) at a weight ratio of 75/25 and 65/35, respectively (the apparent compositions of these samples correspond to the compositions of the samples 3 and 4 of this invention) were used. The results are shown in Table 6.

Table 6

| Polymer samples | No. | 26 | 27 |
|---|---|---|---|
| | Type | Control samples | |
| Weight ratio of polymer sample 1/polymer sample 8 (weight ratio of butadiene-1,3/2-methyl butadiene-1,3) | | 75/25 | 65/35 |
| Properties of vulcanizates | | | |
| Tensile strength (Kg/cm²) | | 279 | 268 |
| Elongation (%) | | 610 | 690 |
| 300% modulus (Kg/cm²) | | 96 | 94 |
| Hardness (JIS) | | 63 | 64 |
| Rebound (%) | | 33.5 | 27.5 |
| Permanent compression set (%) (100° C. × 70 hrs.) | | 72.1 | 79.3 |
| Gehman Test (° C) | | | |
| $T_2$ | | −6 | −5 |
| $T_{100}$ | | −22 | −20 |
| Tensile strength (Kg/cm²) after aging in air | | | |
| After 100° C. × 70 hrs. | | 194 | 190 |
| After 100° C. × 168 hrs. | | 170 | 162 |

As is clear from Table 6, even if the apparent composition corresponds to the composition of the terpolymer in this invention, the samples 26 and 27 have inferior tensile strength, tensile strength after aging, permanent compression set, rebound and cold resistance compared to the samples of this invention.

EXAMPLE 5 (Test 4 for the characteristics of the vulcanizates)

The same test as in Example 2 was performed using polymer samples 1 and 3 except that the compounding recipes and the vulcanization conditions shown in Table 7 were used. The results are also shown in Table 7.

and 35 to 5% by weight of combined 2-methyl butadiene-1,3.

Table 7

| Polymer samples | No. | 3 | | | 1 | | |
|---|---|---|---|---|---|---|---|
| | Type | Samples of the invention | | | Control samples | | |
| Recipe | | | | | | | |
| Copolymer | | 100 | 100 | 100 | 100 | 100 | 100 |
| Zinc oxide (No. 1) | | 3 | 3 | 3 | 3 | 3 | 3 |
| Sulfur | | 0.5 | — | — | 0.5 | — | — |
| Stearic acid | | 0.5 | 0.5 | — | 0.5 | 0.5 | — |
| HAF Black | | 40 | 40 | 40 | 40 | 40 | 40 |
| Tetramethyl thiuram disulfide | | 2.0 | 3.0 | — | 2.0 | 3.0 | — |
| Cyclohexyl benzothiazyl sulfenamide | | 1.5 | — | — | 1.5 | — | — |
| Dicumyl peroxide | | — | — | 2.0 | — | — | 2.0 |
| Vulcanization conditions | | 150° C x | 150° C x | 170° C x | 150° C x | 150° C x | 170° C. x |
| Properties of vulcanizates | | | | | | | |
| Tensile strength (Kg/cm$^2$) | | 229 | 2187 | 251 | 208 | 200 | 226 |
| Elongation (%) | | 380 | 520 | 340 | 450 | 620 | 300 |
| 100% modulus (Kg/cm$^2$) | | 37 | 27 | 48 | 32 | 21 | 60 |
| Hardness (JIS) | | 67 | 63 | 69 | 69 | 64 | 71 |
| Rebound (%) | | 43.0 | 45.0 | 51.0 | 47.0 | 46.0 | 50.5 |
| Permanent compression set (%) (100° C × 70 hrs.) | | 23.0 | 21.5 | 8.7 | 24.8 | 22.0 | 7.9 |
| Gehman Test (° C) | | | | | | | |
| $T_2$ | | −8 | −9 | −8 | −10 | −11 | −10 |
| $T_{100}$ | | −23 | −24 | −23 | −25 | −26 | −25 |
| Tensile strength (Kg/cm$^2$) after aging in air | | | | | | | |
| After 100° C. × 70 hrs | | 234 | 220 | 264 | 196 | 193 | 228 |
| After 100° C. × 168 hrs. | | 215 | 206 | 247 | 152 | 164 | 182 |

It is clear from Table 7 that when the terpolymer of this invention is vulcanized using various conventional vulcanization systems for NBR, the resulting vulcanized products exhibit the same superior characteristics as in Example 2. Table 7 also demonstrates that the terpolymer of this invention gives a vulcanized product having higher tensile strength both in the normal state and after aging than the control sample (NBR).

What we claim is:

1. A vulcanized product of an acrylonitrile/butadiene-1,3/2-methyl butadiene-1,3 terpolymer comprising 15 to 45% by weight of combined acrylonitrile and 85 to 55% by weight of combined diene, said diene consisting of 65 to 95% by weight of combined butadiene-1,3 and 35 to 5% by weight of combined 2-methyl butadiene-1,3.

2. The vulcanized product of claim 1 having a Mooney viscosity (ML$_{1+14}$, 100° C.) of 20 to 150.

3. A process for preparing a vulcanized product of a terpolymer, which comprises heating an acrylonitrile/butadiene-1,3/2-methyl butadiene-1,3 terpolymer comprising 15 to 45% by weight of combined acrylonitrile and 85 to 55% by weight of combined diene, said combined diene consisting of 65 to 95% by weight of combined butadiene-1,3 and 35 to 5% by weight of combined 2-methylbutadiene-1,3, in the presence of a vulcanizing agent at a temperature of 100° to 220° C. for about 1 minute to 2 hours.

4. The process of claim 3 wherein the vulcanizing agent is selected from the group consisting of sulfur, compounds capable of generating sulfur under the vulcanization conditions, and organic peroxides.

* * * * *